United States Patent [19]

Ilg et al.

[11] Patent Number: 4,829,297
[45] Date of Patent: May 9, 1989

[54] COMMUNICATION NETWORK POLLING TECHNIQUE

[75] Inventors: Gregory R. S. Ilg, Avon Lake; Lester A. Jones, Mentor; Mark A. Flood, Mayfield Heights, all of Ohio

[73] Assignee: Allen-Bradley Company, Inc., Milwaukee, Wis.

[21] Appl. No.: 47,313

[22] Filed: May 8, 1987

[51] Int. Cl.$^4$ ............................................. H04Q 9/00
[52] U.S. Cl. ..................... 340/825.080; 340/825.510; 340/825.500; 370/90
[58] Field of Search ............ 340/825.08, 825.5, 825.07, 340/825.02, 825.03, 825.51; 370/112, 90, 96; 178/2 R

[56] References Cited

U.S. PATENT DOCUMENTS

| | | | |
|---|---|---|---|
| 3,806,872 | 4/1974 | Odom | 340/825.12 |
| 3,816,645 | 6/1974 | Ehrich et al. | 178/2 R |
| 4,100,533 | 7/1978 | Napolitano et al. | 340/825.08 |
| 4,310,922 | 1/1982 | Lichtenberger et al. | 370/112 |
| 4,319,338 | 3/1982 | Grudowski et al. | 364/900 |
| 4,477,882 | 10/1984 | Chumacher et al. | 364/900 |
| 4,604,682 | 8/1986 | Schwan et al. | 340/825.5 |
| 4,654,656 | 3/1987 | Deaver et al. | 340/825.08 |
| 4,683,531 | 7/1987 | Kelch et al. | 340/825.08 |
| 4,740,787 | 4/1988 | Kimura | 340/825.08 |
| 4,742,335 | 5/1988 | Vogt | 340/825.08 |

FOREIGN PATENT DOCUMENTS

| | | | |
|---|---|---|---|
| 0012502 | 6/1980 | European Pat. Off. | 340/825.08 |
| 1382133 | 1/1975 | United Kingdom. | |
| 1441128 | 6/1976 | United Kingdom. | |

Primary Examiner—Donald J. Yusko
Attorney, Agent, or Firm—Quarles & Brady

[57] ABSTRACT

In a communication network wherein a master station periodically polls a number of remote stations to determine whether or not each remote station has data to transmit to the master, each of the remote stations is assigned to one two groups. One of the groups is designated as priority stations which commonly have very urgent data for the master station. The group of non-priority stations is sequentially polled for messages to be sent to the master station. The polling of the group of non-priority stations is periodically interrupted so that the master station may poll each of the stations in the priority group to determine if they have messages to send. Upon the completion of the polling of the priority stations, the polling of the non-priority stations is resumed. Periodically a time period occurs for inactive stations to join one of the two groups of stations on the network. This method permits stations that typically have high priority data, to transmit that information more frequently than would be possible if only one polling group of stations existed.

15 Claims, 10 Drawing Sheets

FIG. 1

| STATION NO. | POLLING STATUS |
|---|---|
| 10 | I |
| 11 | I |
| 12 | I |
| 13 | I |
| 14 | M |
| 15 | I |
| 16 | I |
| 17 | I |
| 18 | I |
| 19 | I |
| 20 | I |

FIG. 3A

| STATION NO. | POLLING STATUS |
|---|---|
| 10 | S |
| 11 | I |
| 12 | S |
| 13 | S |
| 14 | M |
| 15 | I |
| 16 | I |
| 17 | S |
| 18 | S |
| 19 | I |
| 20 | S |

FIG. 3B

FAST STATIONS

| STATION NO. |
|---|
| 13 |
| 17 |

FIG. 4

| STATION NO. | POLLING STATUS |
|---|---|
| 10 | S |
| 11 | I |
| 12 | S |
| 13 | F |
| 14 | M |
| 15 | I |
| 16 | I |
| 17 | F |
| 18 | S |
| 19 | I |
| 20 | S |

FIG. 6A
MAIN PROGRAM

FIG. 6B

MAIN PROGRAM

FIG. 6C
MAIN PROGRAM

FIG. 7A

MULTIPLE POLL FAST SCAN ROUTINE

FIG. 7B

SINGLE POLL
FAST SCAN
ROUTINE

FIG. 8

STATION POLLING ROUTINE

FIG. 9

WAIT ROUTINE

COMMUNICATION NETWORK POLLING TECHNIQUE

The present invention relates to communication networks in which a master station periodically addresses each station of the network to determine if the station has any messages to transmit and, more particularly, to such networks specifically adapted for use with industrial programmable controller systems.

BACKGROUND OF THE INVENTION

Programmable controllers are typically used to operate industrial equipment according to a stored program. For example, these devices may be used to control unattended electrical utility distribution substations or remote pipeline pumping stations. The programmable controllers at several remote locations are connected to a master controller via communication links, such as telephone lines, to form a network. The remotely located controllers sense the condition of the sub-station equipment and report the sensed status to the master controller. The master controller upon analyzing the status of the remote programmable controllers transmits commands instructing them to activate various pieces of equipment at the substations. For example, in the case of an electrical distribution system the remote controller at a substation may provide information to the master controller regarding the load current on that portion of the electrical grid. The master controller in response to the sensed information may switch power from other parts of the grid to meet an increased demand for electrical power or may divert electricity from a substation having a lesser demand to one having a great demand.

The master controller in this type of network gathers information from all of the remote controllers by polling each one in a fixed order. The memory of the master programmable controller contains a list of all of the remote devices, that are currently active. In polling the remote devices the master controller sequentially scans the list of active controllers on the network and interrogates each one in order to determine whether or not they have information to transmit to the master. If a programmable controller has data to transmit, that information is sent before the next remote controller is interrogated.

Certain ones of the remote controllers may be high priority type devices in that the equipment that they control or the information that they are sensing requires frequent accessing by the master. Depending upon the number of controllers on the network and the amount of data that each has to transmit to the master controller, the sequential polling of the active controllers may not access the high priority ones very often. Therefore, under worst case conditions, the high priority type controllers may not be afforded an opportunity to send their data frequently enough for a timely response to be taken.

One solution to this problem is to divide a large network into smaller networks, each one having their own master controller, and reassigning each remote controller to one of the networks. Although this method decreases the polling scan time and, therefore, increases the frequency at which the high priority devices are accessed, the programmable controllers on one network no longer have direct access to the controllers connected to the other networks. In addition, this solution may be more expensive than utilizing a single network and master controller.

Another function which tends to slow down network operation is the determining whether a previously inactive station seeks to join the network. Each programmable controller station on the network has a unique address which may, for example, be represented by an eight bit digital number to accommodate 256 possible stations. However, the typical communication network has considerably less than 256 stations connected to it. In networks with significantly fewer than the maximum number of stations, considerable time is consumed by periodically testing previously inactive addresses for stations seeking access to the network. For example, if there are only ten stations which could possibly be on the network, the master station must still periodically scan all of the remaining 246 addresses.

SUMMARY OF THE INVENTION

The stations on a communication network consist of a master station, remote stations typically having priority data to send on the network and remote stations typically having non-priority data to send. The remote stations are divided into two groups according to the type of data that they usually send. The master station sequentially polls the group of non-priority stations for messages to be sent on the network. Periodically, the polling of the non-priority stations is interrupted to sequentially poll the high priority group of stations for messages that they have to send. Upon the completion of the polling of the high priority stations, the sequential polling of the other group of stations is resumed.

One embodiment of the present method does not interrupt the polling of the non-priority stations while one of its stations is in the process of sending data on the network. However, upon the completion of that station's transmission the sequential polling is interrupted to allow for a polling of the high priority stations. In addition, at the end of one scan through the stations in the non-priority group the opportunity is provided for new stations to join the network.

An object of the present invention is to provide a single programmable controller communications system which provides frequent access to high priority devices while permitting less frequent access to lower-priority stations on the system.

Another object is to enable the network to be alternatively configured either to wait for a period of time after a scan of all the non-priority stations before commencing another polling scan of these stations; or to immediately commence another scan of them. The periodic polling of the high priority stations continues to occur whether or not a scan of the non-priority stations is taking place.

A further object of this invention is to allow the user to designate a subset of possible station addresses and to poll only the station addresses in the subset. This decreases the time necessary to determine if a new station seeks to join the network as its address is limited to falling within the address subset. Therefore, the master station needs only to check addresses within the subset and not the entire range of possible addresses for the new stations.

DETAILED DESCRIPTION OF THE INVENTION

Figure 1:
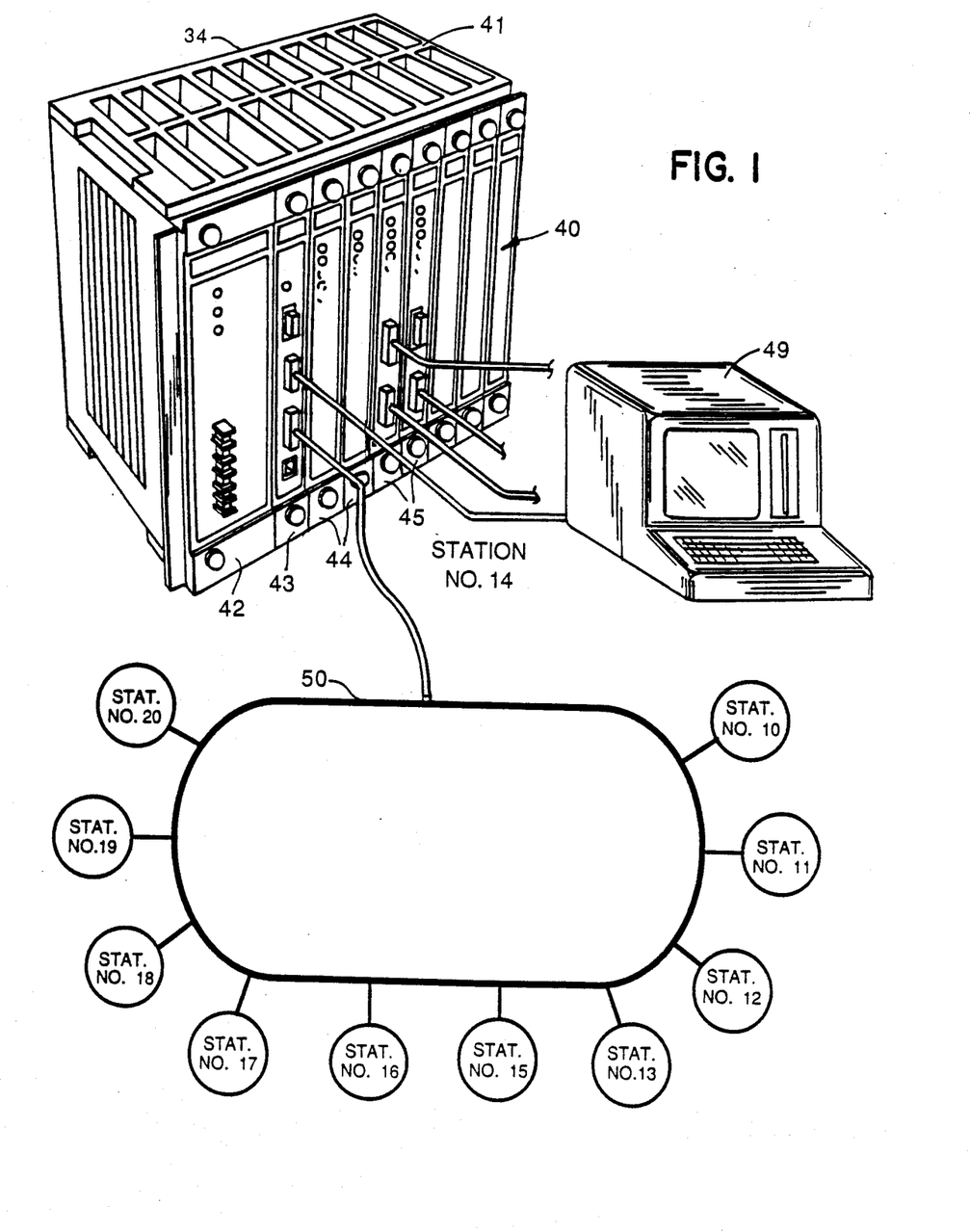
FIG. 1 is a schematic representation of a communication system having a master station incorporating the present invention.

With initial reference to FIG. 1, a programmable controller 40 serves as the master station on a multidrop communication network 50 and is designated station number 14. The network 50 further includes remote stations numbered 10-13 and 15-20 which also are programmable controllers. For example, the programmable controllers at the remote stations 10-13 and 15-20 operate manufacturing equipment at different locations along an assembly line. The master station programmable controller 40 gathers data regarding the assembly line operation from the other stations.

The programmable controller 40 includes a rack 41 having a backplane 34 on its rear face which interconnects a plurality of functional modules 42-45 contained in the rack. A power supply module 42 is positioned on the extreme left side of the rack 41. The remaining modules consist of a system controller 43, two program execution modules 44 and two input/output modules 45. The program execution modules 44 execute computer programs which control pieces of assembly line equipment that are connected to the controller 40 via the input/output modules 45. The system control module 43 supervises the operation of the programmable controller 40 and interfaces the controller to the communication network 50. An operator terminal 49 is connected to the system control module 43.

Figure 2:
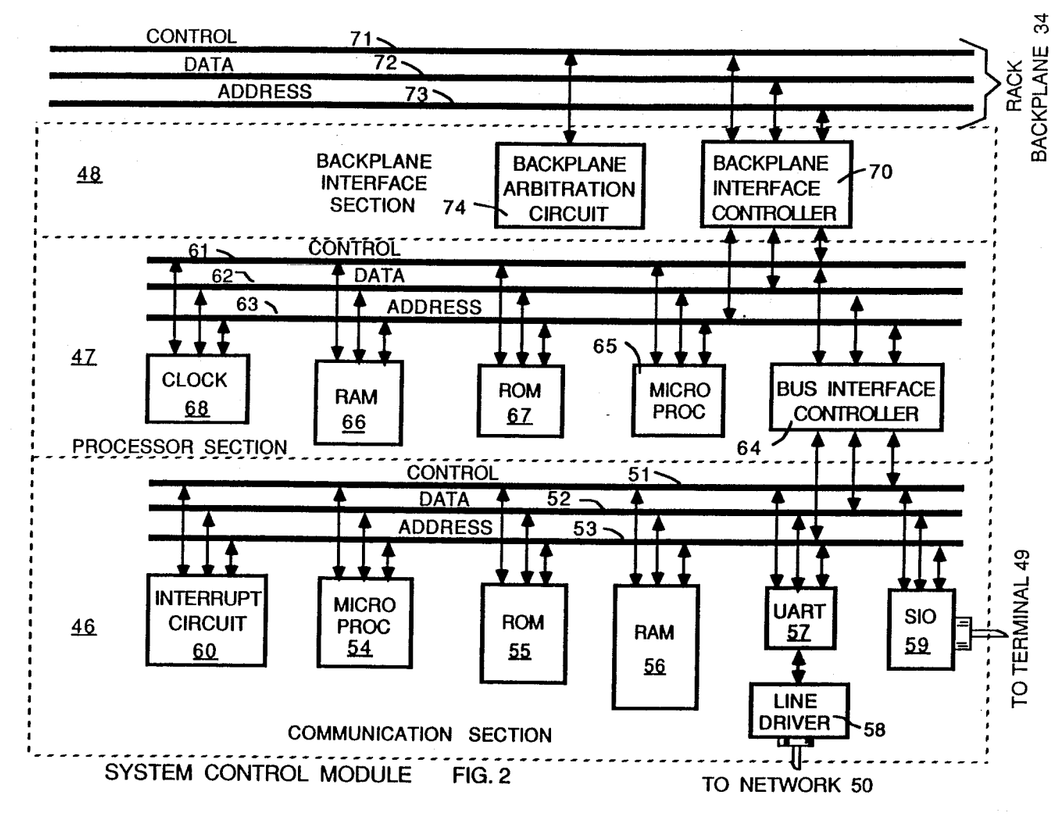
FIG. 2 is a schematic diagram of the system control module in the master station of FIG. 1.

The system control module 43 as shown schematically in FIG. 2 connects to the rack backplane 34 and is divided into three sections for backplane interface, processing and communication operations (as delineated by dashed lines). The backplane interface section 48 supervises access to other rack modules, and the processor section 47 executes a supervisory program for the programmable controller 40. The communication section 46 is responsible for communicating with the other stations on the network 50 and with the operator terminal 49.

The communication section 46 includes a control bus 51 having a number of individual control lines running between various components in the communication section 46, a parallel data bus 52 and an address bus 53. The communications section 46 is built around a microprocessor 54 which executes machine language instructions stored in a read-only memory (ROM) 55. The instructions fetched from the ROM 55 are decoded and executed by the microprocessor 54 to carry out the communication functions. Also located within the communication section 46 is a random access memory (RAM) 56 for temporary storage of data received from or to be sent to the network stations and terminal 49. The RAM 56 is accessed via address bus 33 so that data on bus 32 can be written into or read from the RAM depending upon enabling signals from control bus 31. An addressable interrupt circuit 60 is provided to allow other components within the system control module 43 to interrupt the operation of the communication microprocessor 54 in order for it to carry out a time critical task.

A commercially available universal asynchronous receiver/transmitter (UART) 57 is also connected to the three communication buses 51-53. The UART 57 performs bidirectional data conversion between the parallel data format of the communication data bus 52 and the serial data format of the network 50. The serial data terminal of UART 57 is connected to a line driver/receiver 58 which interfaces to signals levels corresponding to the serial signal standard, such as RS232, RS423 or RS422, of network 50. A serial input/output (SIO) communication controller 59 provides a bisynchronous data port for connecting the operator terminal 49 to the system control module 43.

The processor section 47 has a set of control, data and address buses 61-63 which couple to the buses 51-53 of the communication section 46 via a bus interface controller 64. In response to access request signals on control bus 51 or 61, the bus interface controller 64 connects the communication section 46 data and address buses 52 and 53 to the data and address buses 62 and 63 of the processor section 47. The processor section 47 includes a separate microprocessor 65 which executes programs stored in ROM 67 and stores data in RAM 66. A clock circuit 68 is connected to the processor section buses 61-63 to provide system and real time clock signals for the programmable controller 40.

A backplane interface controller 70 couples the processor section buses 61-63 to the control, data and address buses 71, 72 and 73 respectively on the backplane 34 of rack 41. This backplane interface controller 70 is similar to the bus interface controller 64 and enables the system control module 43 to send and receive data between other modules in the rack 41. The backplane interface section 48 includes an arbitration circuit 74 for supervising the access to the rack backplane 39 and resolving conflicts when several rack modules simultaneously request access to the backplane.

Referring again to FIG. 1, all data messages are sent through the master station 14 of the exemplary communication network 50 described herein. The messages are transmitted between the master and other stations using conventional techniques and protocols. For example, a message to be sent is divided into one or more data blocks each having a fixed length. The data blocks are then transmitted individually over the network 50 to the master station which reassembles them into the full message. The message transmission is concluded by sending a data block containing a special end of text (EOT) character. The station number provides a unique network address for each programmable controller. The master station 14 can process messages from up to 256 stations. However, the typical network such as shown in FIG. 1 has significantly fewer than the maximum number of stations. Recognizing this, the present system permits the user to define a subset of station numbers within which must lie all valid station addresses. For example, if the maximum number of remote stations that will ever be physically connected to the network is ten, the user may limit the addresses to a range of eleven addresses, e.g. from 10 to 20 inclusive. This range allows for the master status address. As the master station will never be sending messages to itself, it may as an alternative have a station address outside of the designated range. With this defined range, the master station 14 will only scan the subset of addresses between 10 and 20 inclusive in seeking inactive stations which want to join the network 50. This provides a more rapid polling for inactive stations and permits inactive stations to join the network faster than if all 256 addresses had to be scanned.

Each active station within the defined address range is assigned by the network operator to one of two groups of stations. The groups are referred to as fast and slow corresponding to the frequency at which their member stations are polled. As used herein polling refers to the master station 14 transmitting a command on the network 50 informing a particular remote station that it may now send any data it has to the master station. The stations in the fast group send priority data and therefore are polled more often than the stations in the slow group. The "fast" stations provide data that is urgently needed by the master station such as sensing dangerous conditions requiring that immediate responsive action be taken. The polling of the two groups of stations will be described in terms of two embodiments.

Figure 5A:
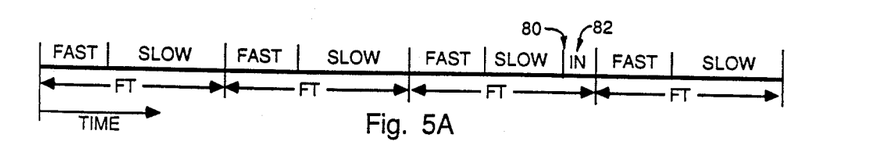
FIGS. 5A and B are timing diagrams of the polling of each of the stations in FIG. 1 according to two different embodiments of the present invention.

A first embodiment of the present station polling scheme is depicted by the time line of FIG. 5A. Each of the stations in the slow group is sequentially polled to determine whether or not it has any data messages for the master station. The master station 14 then waits a predetermined interval for a reply. If a station has no messages but wishes to remain on active status, it will return an end of text (EOT) character without any additional information. Upon the receipt of this character, the master station 14 then will poll the next slow station.

The master station 14 also has a real time interrupt which at a periodic interval FT (FIG. 5A) will interrupt the scan of the slow station group to commence a scan of all of the stations in the fast station group. Each of the stations in the fast group is sequentially afforded an opportunity at this time to send all the data messages that it may have. The method of polling each station in the fast group is the same as for the ones in the slow station group described above.

When the polling scan of the fast stations is completed, the polling of the slow station group will resume at the point where it had been interrupted. With reference to FIG. 5A, it is seen that the portion of each time interval FT that remains after a fast station scan is devoted to polling the group of slow stations. Eventually, after several time intervals FT, a scan through all of the stations in the slow group is completed as occurs at point 80. At this time, one of the inactive addresses will be polled to determine if there is a station at that address which seeks to join the network. If so, the station is added to the slow group. After the inactive station polling interval 82, another scan of the slow stations commences by polling the first slow station and the polling process repeats itself.

Figure 5B:
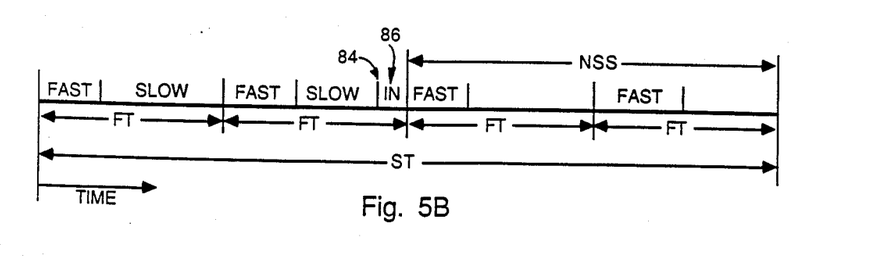

An alternative polling scheme is shown in FIG. 5B wherein the polling scan of the slow stations does not run continuously but commences only upon the occurrence of a second real time interrupt every interval ST. Specifically, the slow station polling is still interrupted at time intervals FT for a polling scan of the fast stations. The portions of each interval of remaining after a fast station is allocated to polling as many slow stations as is possible until the end of the next first interrupt interval FT. When the scan of the slow station group is completed at point 84 on the time line, the slow station polling is suspended until the occurrence of the next slow scan interrupt after the second interval ST. Next, one inactive station address is polled during interval 86. This leaves a period of time NSS during which no slow station polling occurs but during which the fast designated stations are polled. The master station 14 also continues to transmit messages to both types of stations during the NSS interval. In this latter embodiment both the fast and the slow station polling scans are initiated upon the occurrence of separate real time interrupts.

It should be noted that the diagrams in FIGS. 5A and B are exemplary only. Depending upon the total number of stations on the network, the time necessary for them to transmit data and other factors, a different number of intervals FT may occur before the completion of the slow station scan at points 80 and 84. Also the relative amount of each interval FT consumed by the fast station scan may differ from interval to interval. Similarly with reference to FIG. 5B more intervals FT may occur before the end of interval ST.

The polling schemes illustrated in FIGS. 5A and B are controlled by a computer program in the communication section 46 of the master station 50. The control program is stored in ROM 55 and is executed by microprocessor 54. The operation of the program will be described with reference to the circuit in FIG. 2 and the flow charts of FIGS. 6-9.

Figure 3A:
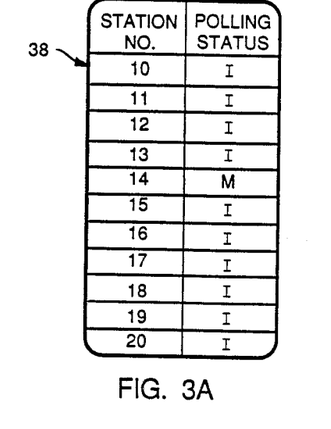
FIGS. 3A, B and C illustrate master station memory tables containing a list of the network stations and their polling status at various stages of the system operation.

When the network 50 is initially activated, a main station table 38 is set up in the RAM 56 of the master station's communication control section 46 as illustrated in FIG. 3A. The main table contains an entry for each address in the previously designated subset range and a field for each entry which indicates the polling status of a station at that address. Each of the addresses in initially assigned an inactive status (I) with the exception of the master station number 14.

Figure 3B:
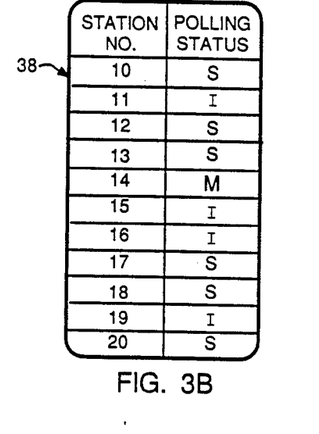
Figure 3C:
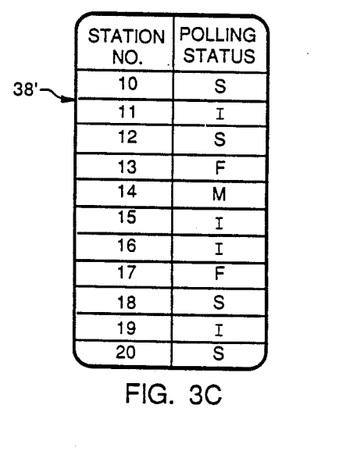
Figure 4:
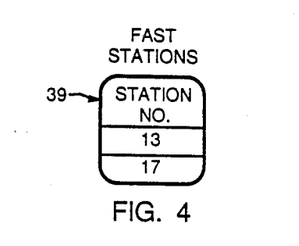
FIG. 4 illustrates another master station memory table containing a list of the fast scan stations.
Figure 6A:
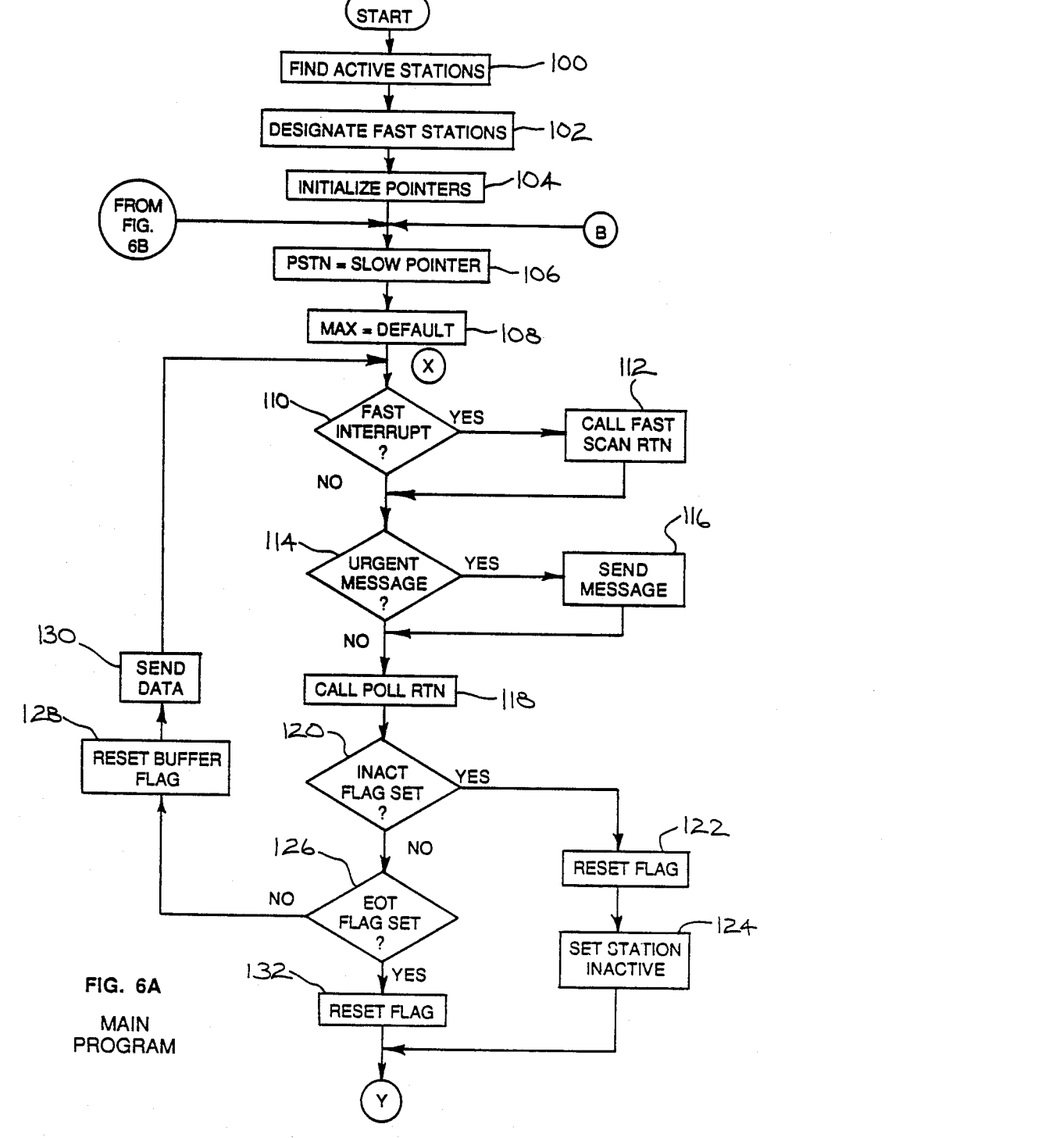
FIGS. 6A, B and C represent the main flow chart of the computer program for polling the stations on the communication network.

After other configuration tasks have occurred, execution of the main polling scan program begins. Referring to FIGS. 2, 3A and 6A the communication section 46 in the master station 14 interrogates each of the station addresses in the main table 38 to determine whether or not there is an active station at that address at step 100 of FIG. 6A. At this point each of the stations which is found to be active is assigned a slow scan status as designated by the letter S in the main table 38 depicted in FIG. 3B. The communication microprocessor 54 then at step 102 accesses the terminal 49 via the serial I/O controller 59 enabling the operator designate stations for the fast group. As shown in FIG. 3C, stations 13 and 17 have been designated as being in the fast station group as indicated by the letter F. Once the operator has designated the fast stations, a second memory table 39 illustrated in FIG. 4 is set up in the communication section RAM 56. This latter table 39 contains an entry for each of the fast scan stations.

After the two station tables 38' and 39 have been established, several locations in RAM 56 are designated at step 104 as separate address pointers for slow and inactive stations. These pointers are initialized to the address of the first station of each type in the main station table 38 depicted in FIG. 3C. A fast station pointer is also set to the first address in the fast station table 39 of FIG. 4. At process point 106 a station polling pointer (PSTN) in RAM 56 is set equal to the address contained in the slow station pointer memory location. A counter address (MAX) in RAM 56 indicating the maximum number of times that a station is polled before the master station polls the next station is set by microprocessor 54 to a default value at step 108.

As indicated by process block 110 a fast interrupt address in the interrupt circuit 60 is checked by the microprocessor 54. A bit in this address will be set by the real time clock 68 in the processor section 47 when the fast station scan interval FT has expired indicating that it is time to poll the high priority stations in the fast station group. If an interrupt has occurred the program at process block 112 calls the fast scan routine, which polls each of the stations in the first group. This routine will be described in detail subsequently.

If a fast interrupt has not occurred the program flow advances to decision block 114 where another interrupt address in the interrupt circuit 60 is checked to determine whether the master station 14 has received an urgent message which is to be transmitted to one or more of the remote stations. For example, if the processor section 47 of the master station 14 has a command for another station, the command will be formulated as a message data block and stored in the communication RAM 56. The processor section 47 then sets the message interrupt bit at an address in the interrupt circuit 60. When this bit is set, the communication microprocessor 54 uses a standard routine to transmit the message via the UART 57 and line driver 58 over the network 50 as designated in program block 116. Alternatively, the interrupt routines handled at steps 110–116 could be placed outside of the individual station polling loop, e.g. after step 132, so that the polling of a slow station is not interrupted until all its data has been sent.

The station polling subroutine is called at step 118 to poll the station address indicated by the slow station pointer. This routine, which is used to poll both types of stations (slow and fast), is shown in detail in FIG. 8 and begins by the microprocessor 54 setting the contents of a retry counter address in RAM 56 to zero. Next, at step 202, the station pointed to by the station pointer PSTN, in this instance a slow scan station, is polled once to determine whether it has any data to transmit to the master station 14. To poll the station, the communication section 46 transmits a command to the designated station instructing it to send any available data. Following the transmission of this command, a timer routine is initialized and started at step 204.

The UART 57 is then checked by the microprocessor 54 to see if a valid data character has been received from the polled station. If valid data was not received, the microprocessor 54 checks the timer value at block 208 to see if the timer has expired. If the timer has not expired the program loops back to decision block 206 to again test the UART 57 for valid data from the network 50. Once the timer has expired, the contents of the retry counter RAM address are incremented at step 210 and the new contents are checked against the maximum limit value (MAX) at decision block 212. If the maximum number of polling retries has not occurred, the program returns to step 202 where the communication section 46 polls the designated station again. If the maximum number of retries has occurred without receiving valid data, the polling routine then sets an inactive flag in a RAM 56 address (step 214) and returns to the main program in FIG. 6A.

If, however, a valid data character was received by UART 57, the microprocessor 54 stores the character in a buffer area of RAM 56 at step 216. Each subsequent character is stored at successive locations in the data buffer. This process continues until either a full frame of data or an end of text character is received. The program then advances to step 218 where the microprocessor 54 evaluates the data buffer in RAM 56 to determine whether the end of text (EOT) character was received. If this character was received, the end of text flag is set at process point 220 and a return to the main program occurs. If an end of text character was not received, indicating that a full block of data was received and stored in the buffer, a text buffer flag is set in RAM 56 at step 222 to indicate such receipt to the main program. The polling routine then returns to the main program in FIG. 6A.

When the polling routine returns to step 120 in FIG. 6A, the microprocessor 54 checks RAM 56 to see if the inactive station flag is set indicating that the polled station is now inactive. If the flag is set, it is reset at step 122 and the status of the slow station in the main station table 38' in RAM 56 is changed by microprocessor 54 to an inactive status indication (I) at step 124. Then the program flow advances to node Y. If the inactive flag was not set, the end of text (EOT) flag is checked at decision block 126.

If the EOT flag was not set, the text buffer flag is reset (step 128) and the received data is then made available to the processor section 47 for processing. This is accomplished at process point 130 by the communication microprocessor 54 signalling the bus interface controller 64 via a line of control bus 51 that the communication section 46 has data for the processor section 47. Once the bus interface controller 64 obtains access to the processor buses 61–63, they are connected to the communication busses 51–53 and a control signal is sent to the communication section microprocessor 54. Upon receiving this signal, the message data is transfered from the communication RAM 56 to a buffer area in the processor section RAM 66 and a flag is set to indicate this transfer to the processor section microprocessor 65. At this point, the program flow returns to step 110 to continue polling the same station for the remaining data until an EOT character is received.

Figure 6B:
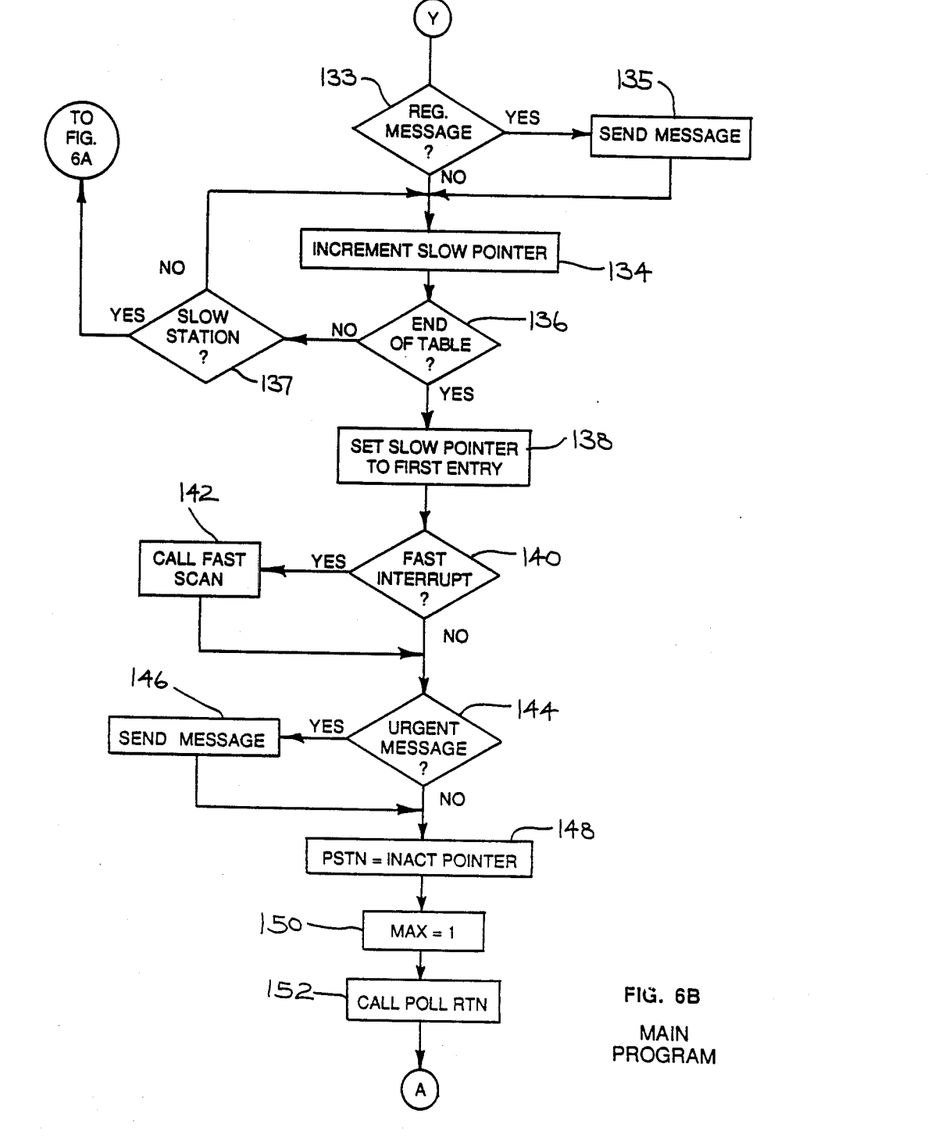
Figure 6C:
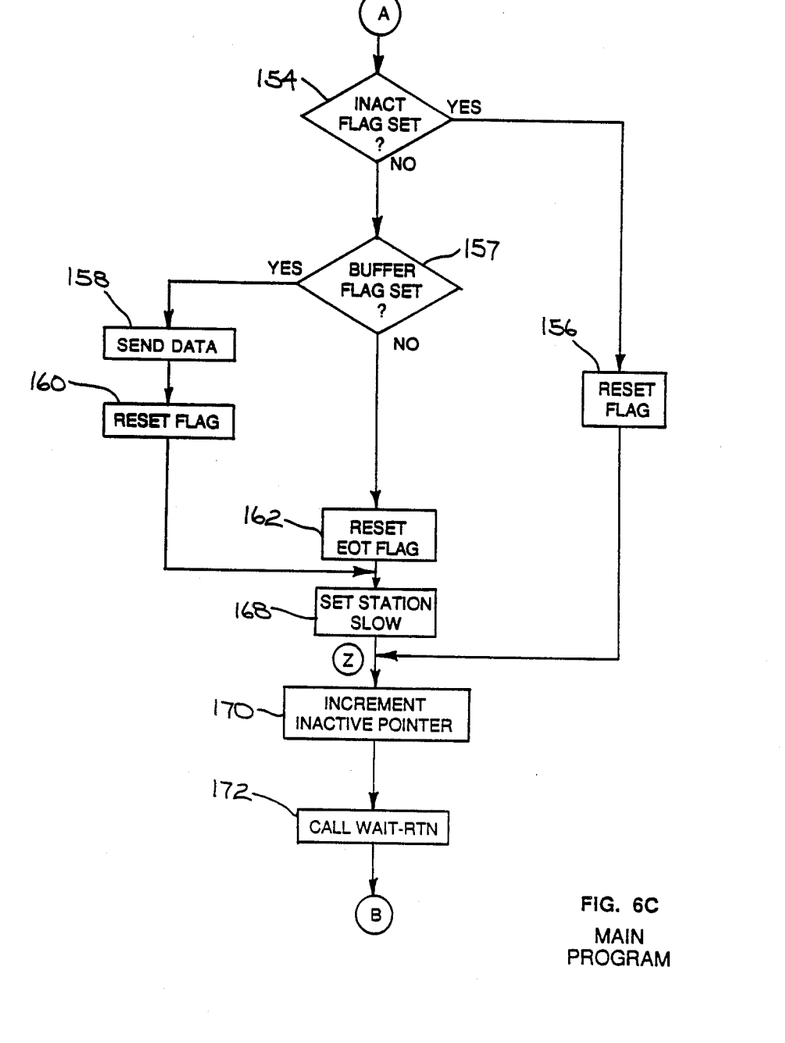

If the end of text (EOT) flag is determined to be set at step 126, it is reset at point 132 and the program advances through node Y to step 133 on FIG. 6B. At this juncture, the regular message interrupt bit is tested by addressing the interrupt circuit 60 to determine if any non-urgent messages are waiting for the master station 14 to send. If so, one of the messages is sent at step 135.

After handling the regular message interrupt, the slow station pointer is incremented to the address of the next entry in the main status table 38' (FIG. 3C) which contains a slow scan (S) designation. This is accomplished by incrementing the previous pointer address by one location of the main station table 38'. The new pointer value is tested by microprocessor 54 at step 136 to determine if it is beyond the last address of the main station table 38'. If it is not, the entry at the new table location is tested at 137 for a slow scan designation. If the designation is not that of a slow station, such as inactive, fast or master, the pointer is again incremented at step 134. Once another slow station is found at step 137, the program returns to node B to poll the next slow station. If the slow station pointer is incremented beyond the end of the main station table 38' in RAM 56, the scan of all of the slow stations is complete. The slow station pointer is reset to the first slow station table entry at step 138.

After the completion of a slow station scan, another interrogation of the fast interrupt memory address occurs at step 140 to determine if the time interval FT has expired so that a scan of the fast stations can occur at point 142. Another check is made at 144 of the urgent message interrupt address in circuit 60 to ascertain if an urgent message is waiting. If one is waiting, it is sent at step 146.

The program is now at points 80 and 84 on the time lines of FIGS. 5A and B respectively, and a check is made for an inactive station seeking to join the network. At step 148, the contents of station polling pointer (PSTN) address is set equal to the contents of inactive station pointer address and the maximum polling retry counter (MAX) is set equal to one at process block 150. The inactive station address is then polled by calling the station polling subroutine (FIG. 8) at point 152. The inactive station address may or may not be assigned to a station physically connected to the network. After the inactive station address has been polled, a check is made at decision block 154 of FIG. 6C of the inactive flag which will be set if the station is still inactive. In which case, the inactive flag is reset at step 156 and the program branch advances to node Z.

If, however, the inactive flag is not set indicating that the station is now active, the text buffer flag is checked at step 157 to determine whether a block of data has been received. Typically, a station going active will send a single data block to indicate the station's operational status. This data block is then sent to the processor section 47 at step 158, and the text buffer flag is reset at step 160. If the buffer flag was not found to be set at step 157, the end of text flag is reset at point 162. After either step 160 or 162, the scan status of the station in the main station table 38' (FIG. 3C) is changed to a slow designation (S) at point 168. The inactive station pointer is then incremented at step 170 to the next inactive table entry. The incrementation of the inactive station pointer is similar to that of the slow station pointer incrementation previously described, except that the incrementation continues until an inactive designation is found in the main station table 38' depicted in FIG. 3C. Step 170 also resets the pointer if it is incremented beyond the end of the table 38' addresses.

The next step designated 172 calls a wait routine which is used only in the polling scheme embodiment illustrated in FIG. 5B. This routine suspends the scan of the stations in the slow group during time period NSS. This wait routine, shown in the flow chart of FIG. 9, delays the start of another polling scan of the slow stations until interrupt circuit 60 indicates the occurrence of a slow station interrupt after internal (ST). The wait routine consists of a loop during which fast station polling scans occur and regular and urgent messages are sent by the master station 14.

Specifically, at step 400, the fast station interrupt address in the interrupt circuit 60 is tested and if it has been set, the fast station scan routine is called. Next at block 402 the urgent message interrupt address in the interrupt circuit 60 is tested and if found to have been set these messages are transmitted by the master station 14 to the specified recipient stations. A test for any regular messages to be sent is conducted at step 404 and if such exist, one message is transmitted to the proper remote station. At the bottom of the loop, decision block 406, a check is made of the interrupt circuit 60 for the slow station scan interrupt which is initiated by the real time clock 68 after interval (ST). If the slow station interrupt did not occur the wait routine transfers back to the beginning for another check of the fast station scan and message interrupts. This looping continues until a slow station interrupt has occurred at which point the wait routine returns to point B in the main program flow chart (FIG. 6A) to commence another scan of the slow station group.

As can be seen with reference to the flow chart in FIGS. 6A and B, the slow designated stations are polled until either a fast station interrupt occurs or the master station has a message to send to one of the remote stations. The fast station interrupt is generated by the master station real time clock 68 at intervals FT as shown in the timing charts of FIGS. 5A and B. During system configuration, the operator is presented with a choice of the type of fast scanning to be used at each interval FT. The first type is a multiple poll of the fast scan stations whereby a fast designated station with data messages is continuously polled until all of its data is received. The other fast polling technique polls each fast station a single time during a fast scan interval so that only one block of data is received.

Figure 7A:
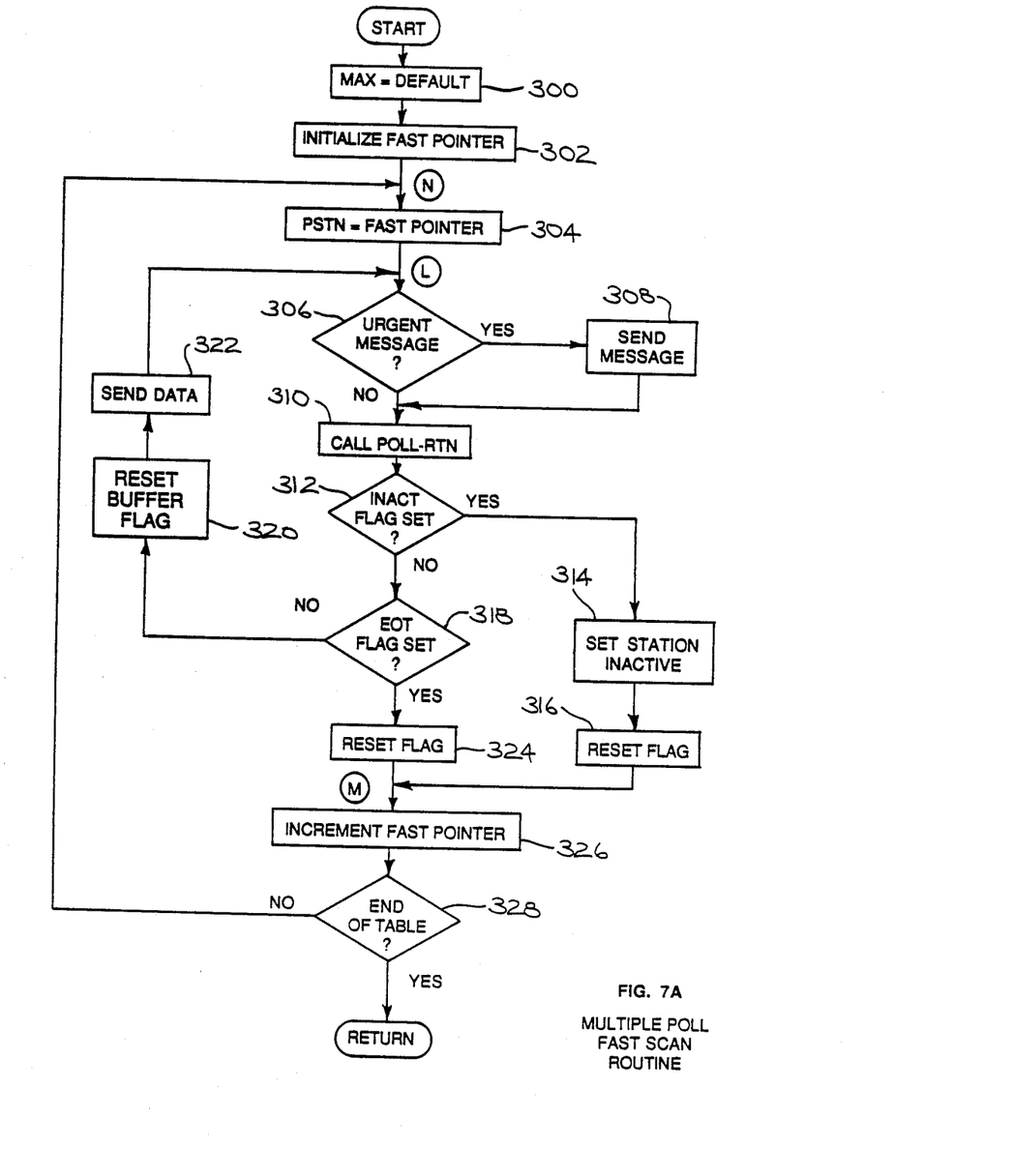
FIGS. 7A and B are two versions of a subroutine that is called from the main flow chart to scan fast stations.

FIG. 7A presents a detailed flow chart of the routine for a multiple polling of the fast designated stations. At the start of the fast station polling routine, step 300, an address for the maximum number of retries is loaded with the fast station default value and the fast station pointer address is initialized at step 302 to the address at the top of the fast station memory table 39 (FIG. 4). The slow station address contained in the polling routine station pointer (PSTN) is "pushed" onto the memory stack and the pointer (PSTN) is then set equal to the contents of the fast station pointer address at process block 304. A test is conducted at decision block 306 of interrupt circuit 60 for the urgent message interrupt and if its bit is set the message is sent at step 308 before polling the fast station.

Figure 8:
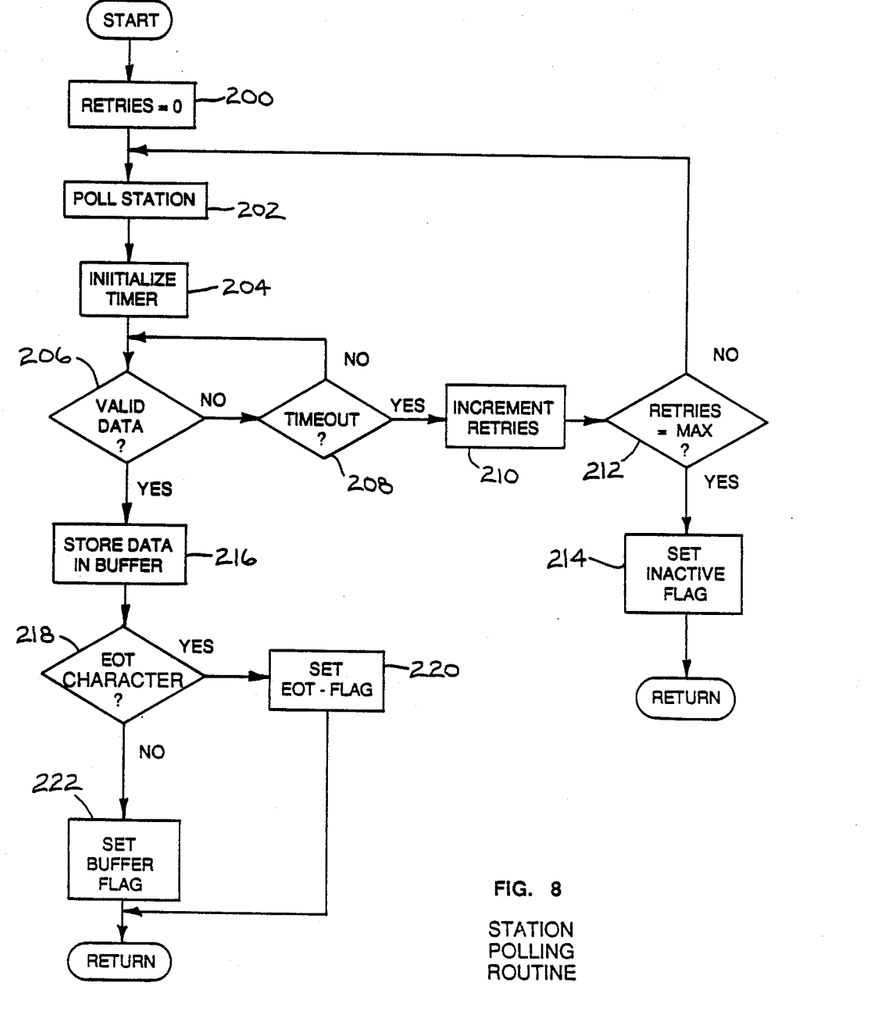
FIG. 8 is a flow chart of the routine to poll an individual station.
Figure 9:
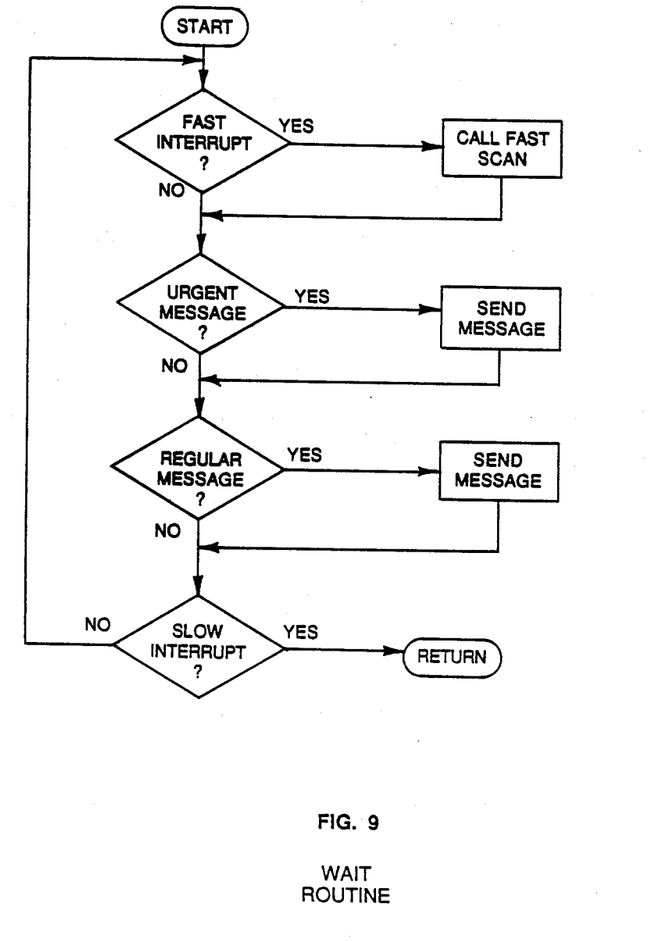
FIG. 9 is a flow chart of the wait routine used in the embodiment of FIG. 5B.

The next program step 310 calls the station polling routine shown in FIG. 8 to poll the designated fast station. Upon return from the routine, decision block 312 checks to see if the inactive flag was set by the polling routine. If so, step 314 sets the station address inactive by removing its entry from the fast scan station table 39 (FIG. 4) and changing corresponding the designation in the main station table 38' (FIG. 3C) to inactive. The inactive flag is then reset at point 316 before advancing to the main branch at node M.

If the polling routine did not return an inactive flag, the program transfers from step 312 to decision block 318 where the end of text (EOT) flag RAM address is tested. If that flag is not set indicating that a data block was received, the text buffer flag is reset at point 320 in the branch loop. The data block is then transferred to the master station processor section 47 at step 322 before returning to node L to again poll the same fast station to obtain the remaining data blocks that it has. The loop continues until an EOT character is received by UART 57 and detected at step 318; at which point the EOT flag is reset at 324.

The program then advances through node M to step 326 where the fast station pointer is incremented by one address to the next entry in the fast station memory table 39 depicted in FIG. 4. The new pointer value is then tested at point 328 to see whether it is beyond the last address of the fast station table 39 in RAM 56. If the fast station pointer is still at a legitimate fast station table address, the program loops back to node N and the new pointer is used to set the polling station pointer (PSTN) at step 304 so that the next fast station may be polled. This looping to poll each of the station in the fast station table 39 continues until the pointer is incremented beyond the end of the table. At that time the station pointer PSTN is restored the previous slow station address and the routine returns to the main program.

Figure 7B:
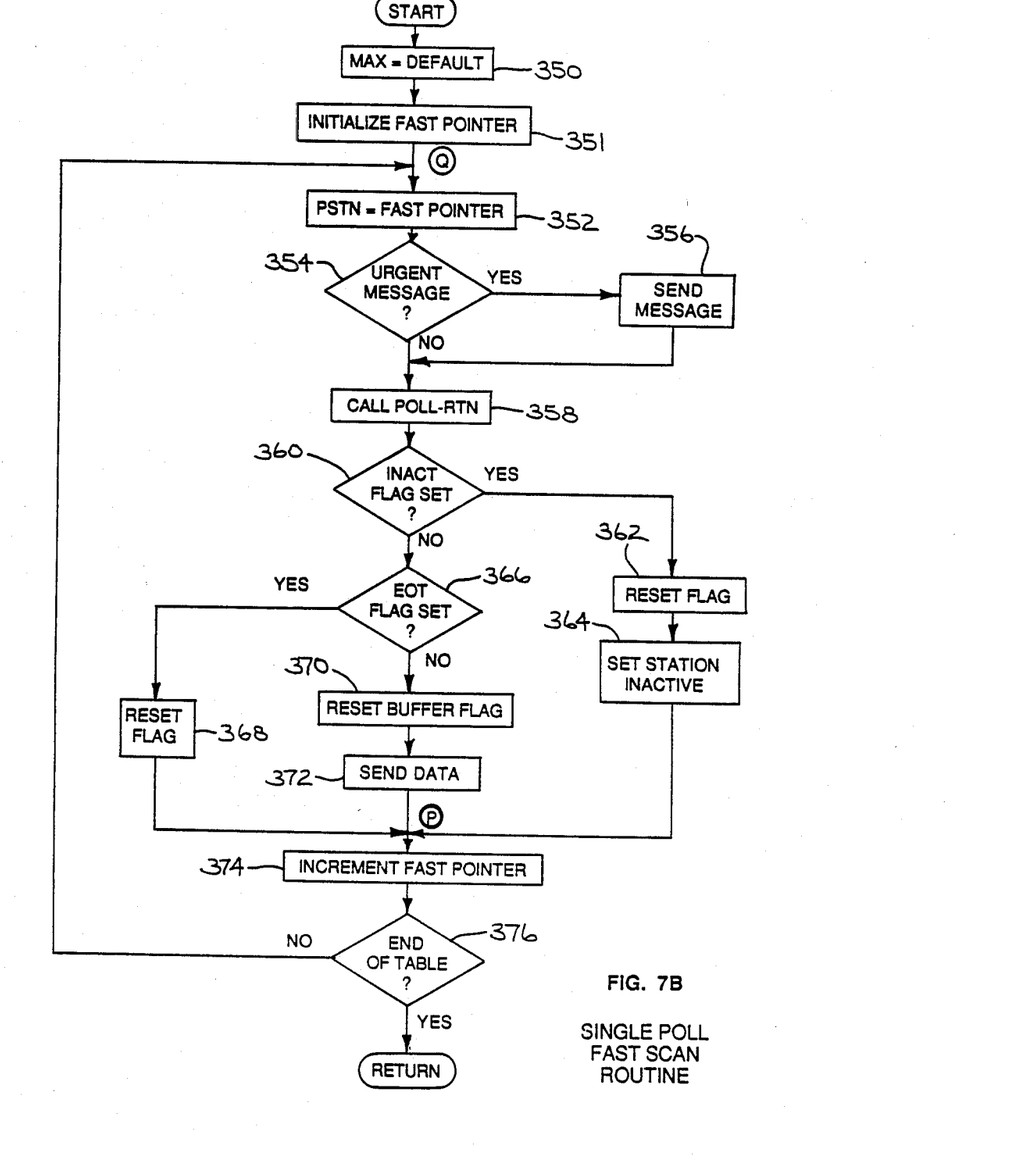

The alternative fast station scan routine shown in the flow chart of FIG. 7B polls each fast station only a single time during the fast intervals shown in FIGS. 5A and B. The single poll routine in FIG. 7B starts off by setting the value in the maximum retry counter address (MAX) to the fast default at step 350 and initializing the fast station pointer at block 351. The polling routine station pointer PSTN is "pushed" onto the memory stack before being set equal to the fast pointer at point 352. The urgent message interrupt address is then tested at decision block 354 and if such a message is waiting to be transmitted, it is sent at step 356.

The station polling routine (FIG. 8) is then called at step 258 to poll the fast station designated by pointer PSTN. Upon returning from the polling routine, the inactive station flag is tested at step 360. If the inactive flag is set, step 362 resets it and the station status in the memory tables 38' and 39 is set inactive at step 364 before the branch returns to node P. If the inactive flag is not set, the end of text flag address is checked at step 366 and if set it is reset at step 368 before progressing to node P. If the end of text flag is not set, indicating that a block of data has been received from the fast station and stored in RAM 56, the buffer flag address is reset at block 370 and the data is sent to the processor section 47 at point 372.

Once the data block has been sent the program flows through node P to increment the fast station address pointer at step 374. Decision block 376 checks to see if the new pointer value is beyond the end of the fast station memory table 39. If the pointer is still at a valid table address, the routine transfers back to node Q to poll the next fast station. Once the fast station pointer is beyond the end of the fast station table 39 in RAM 56, the fast station scan routine returns to the point in the main program (FIGS. 6A and B) where it had been called.

The single polling routine of FIG. 7B differs from the multiple fast polling routine of FIG. 7A in that only a single polling of each fast scan station occurs during each fast interval shown in FIGS. 5A and B. With single polling only one data block is obtained from a station during the fast scan period, rather than the entire message. This single polling technique provides a shorter fast scan interval thereby minimizing the affects of interrupting the scan of slow stations. This will have minimal affect on the data transfer from the stations in the fast group if their messages can be sent in one data block. However, if a fast station has several blocks of data to send, the single polling method requires several fast scan intervals to complete the transfer thereby slowing down the transfer.

What is claimed is:

1. A method for polling stations on a communications network comprising the steps of:

sequentially polling each station in a first group of active stations for messages to be sent on the network by sending a command to each such station;

periodically interrupting the polling of the first group of active stations to poll at least one station in a second group of stations for messages to be sent on the network by sending a command to each such station, whereby the stations in one group are polled more frequently than the stations in the other group; and resuming the sequential polling of the first group of stations upon the completion of polling of at least one station in the second group.

2. The method as recited in claim 1 wherein the amount of data that a station may send each time that it is polled is limited to a fixed amount; and further comprising, when a given station is found with a message to send, continually polling only that given station until the entire message has been sent.

3. The method as recited in claim 2 wherein said step periodically interrupting the polling of the first group of stations includes inhibiting the interrupting while a station is sending a message.

4. The method as in claim 1 further comprising the step of occasionally polling a station that is not a member of either group to determine if it desires to join one of the groups of stations.

5. A method as in claim 1 wherein the steps of polling the first group or the second group of stations, both include the step of deleting a station from the respective group which does not respond to being polled.

6. The method as in claim 1 wherein the steps of sequentially polling the first group of stations is commenced at periodic intervals.

7. The method as in claim 1 wherein all of the stations in the second group are sequentially polled every time the polling of the first group of stations is interrupted.

8. In a communication network having a master station capable of accessing X number of station addresses, a method of polling stations on the network comprising the steps of:
(a) defining a subset of Y station addresses such that Y is less than X;
(b) assigning each station on the network a unique address selected from the subset of Y station addresses;
(c) sequentially polling a first group of active station addresses within the subset for messages to be sent on the network;
(d) interrupting the polling of the first group of station addresses to poll at least one station address in a second group of active station addresses within the subset for messages to be sent on the network, said interrupting occurring at a given interval from when the second group of station addresses was last polled; and
(e) then continuing the sequential polling of the first group of station addresses.

9. The method as in claim 8 further including allowing the master station to transmit messages after the completion of polling each station within the first group.

10. The method as in claim 8 further including the step of occasionally polling each of the station addresses within the subset that are not in either the first or second group to determine if the address is assigned to a station that seeks to join one of the two groups of station addresses.

11. The method as recited in claim 8 wherein in step (e) the sequential polling of the first group of station addresses continues from the point where the polling was previously interrupted.

12. A method for polling stations on a communication network comprising the steps of:
sequentially polling each station in a first group of active stations for messages to be sent on the network by sending a command to each such station;
occasionally interrupting the polling of the first group of stations to poll at least one station in a second group of active stations for messages to be sent on the network by sending a command to each such station; and
resuming the sequential polling of the first group of stations upon the completion of polling of at least one station in the second group, whereby the stations in one group are polled more frequently than the stations in the other group.

13. The method as recited in claim 12 wherein when a given station is found with a message to send, continually polling only that given station until the entire message has been sent.

14. The method as recited in claim 12 wherein the sequential polling of the first group of station addresses resumes from the point where the polling was previously interrupted.

15. The method as in claim 12 further including the step of occasionally polling station addresses that are not in either the first or second group to determine if the address is assigned to a station that seeks to join one of the two groups of station addresses.

* * * * *